United States Patent Office 3,448,800
Patented June 10, 1969

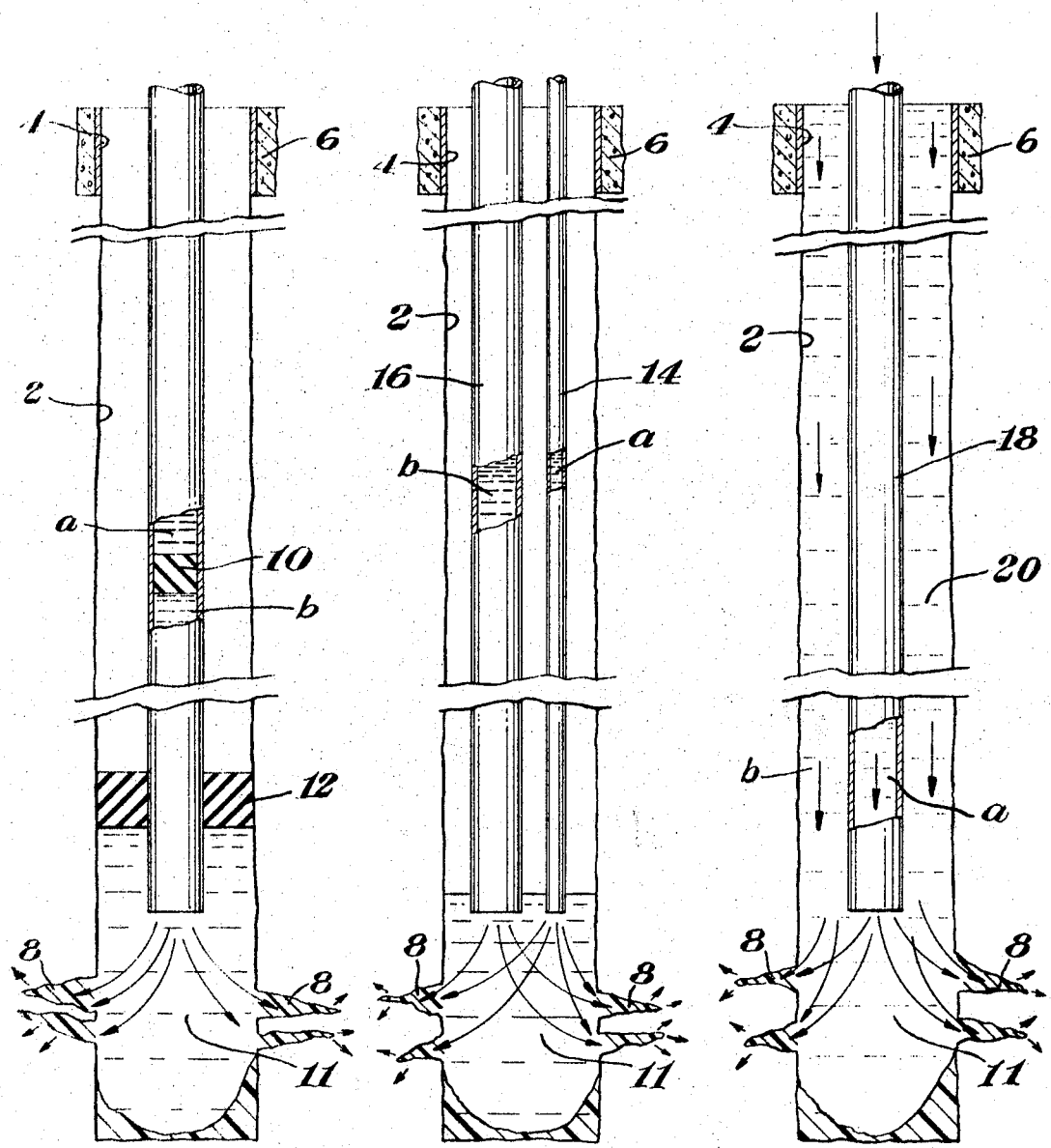

3,448,800
METHOD OF INHIBITING LOST CIRCULATION FROM A WELLBORE
Patrick N. Parker, Tulsa, Okla., and Winton W. Wahl, Odessa, Tex., assignors to The Dow Chemical Company, Midland, Mich., a corporation of Delaware
Filed June 30, 1967, Ser. No. 650,403
Int. Cl. E21b *33/13, 21/04*
U.S. Cl. 166—294           5 Claims

ABSTRACT OF THE DISCLOSURE

Plugging of underground void including particularly one encountered during a well drilling operation which results in lost circulation problems is attained by injecting into the void, or opening leading thereto, two streams of fluids: one comprising a particulate mineral substance suspended in an aqueous carrier liquid and the other a particulate polymer suspended substantially in a nonaqueous carrier liquid and bringing the two substances together in intimate admixture in the void or opening thereto to effectuate a plug.

---

When a well is drilled into a geologic formation by the conventional procedure of making hole therethrough employing a fluid which is circulated down the hole and back up to ground level, delays and additional costs are sometimes experienced because the wellbore penetrates or makes communication with a void, such as a cavity or passageway in the formation. Such occurrence generally results in a situation known as lost circulation. The term is based upon the accompanying loss of drilling fluid from the wellbore into the void to such extent that a loss of fluid impedes progress, requires the use of large amounts of emplacement fluid, and sometimes is so pronounced that the drill becomes stuck in the hole which results in down time and unscheduled expense.

Lost circulation, obviously, is a condition to be prevented or at least corrected when it exists, as expeditiously as possible. Many different approaches to solving the problem of lost circulation have been made. Sometimes, minor loss of circulation can be lessened somewhat by employing especially designed wiper blades that aid by providing a plaster layer on the face of the wellbore. Some success has been derived by emplacing one or more of a variety of materials into the void or at least into the opening leading thereto. Among such materials are shredded or fragmented scrap articles including automobile tires, burlap and other fabrics and particularly rubberized fabrics, paper, cellulosic materials, and sometimes such mineral materials as hydraulic cements, glass, and sand which are carried in an aqueous slurry, often in admixture with some of the scrap materials set forth above. In the more serious cases, lost circulation has continued to plague the drilling of each well being drilled in those types of formations where such voids occur frequently.

A need exists for an improved method of impeding, lessening, or stopping completely the undesirable loss of a drilling fluid into a void adjacent to or penetrated by the wellbore being drilled.

The invention meets this need. Circulation is restored during such drilling operation when confronted by such lost circulation problem, in accordance with the invention, by pumping one of two fluids down the wellbore, such fluid comprising particulated polymer suspended in or slurried in a liquid carrier (which is inert to the polymer, i.e., does not objectionably accelerate the setting of the polymer) and injecting the second of said fluids, comprising an hydraulic material of which silica flour, hydraulic cements, and fly ash are illustrative, slurried in water.

The two fluids are brought together at the locus of the lost circulation, usually an opening in the borehole wall communicating with a void in the formation.

The fluids during injection may be maintained out of contact with each other by one of several ways. Such ways include the use of the borehole alone, the two fluids being maintained apart during injection by separating plugs, e.g., wiper plugs, often supplemented by an inert buffer liquid. Another way is the use of concentric conduits, e.g., the inner being a tubing or casing and the outer being the borehole itself. Another way is the use of separately positioned pipes as conduits, one for injecting one component liquid and the other pipe for injecting the second component liquid.

The two types of fluid are brought together at the locus of the lost circulation problem, viz., the opening leading into the void into or through which the drilling fluid is being lost, whereupon the two materials, being supplemental to each other, form a composition which sets to a sticky, rubber-like plugging solid which is effective to plug off the fluid flow from the wellbore into the void.

Polyacrylamide, preferably containing in admixture therewith a desiccant such as $CaSO_4 \cdot \frac{1}{2} H_2O$ which imparts added strength, is illustrative of the particulated polymer to employ.

The composition used in the invention offers advantages of easy emplacement, of satisfactory setting rate, of possessing the property of being rather easily drilled out of the wellbore (when necessary), and of low cost, in comparison as to other materials. Furthermore, it offers greater uniformity in contrast to scrap materials made up of a variety of materials which perform in a rather unpredictable manner.

Suggested polymers to employ in the practice of the invention are: (1) polyacrylamides, including homopolymers, acrylamide lightly crosslinked by between about 500 and 5,000 parts per million by weight of the monomers present, with such agents as methylenebisacrylamide or divinyl benzene, and a major proportion of acrylamide copolymerized with a minor proportion of other ethylenically unsaturated monomers copolymerizable therewith; (2) polystyrene sulfonate and polyvinyltoluene sulfonate and water soluble salts thereof; and (3) polyvinyl alcohol.

Materials which may be employed as the required liquid carrier for the polymer are polyglycols, e.g., diethylene glycol or triethylene glycol, glycerol, kerosene, naphtha or other liquid hydrocarbons, monohydroxy alcohols including methyl, ethyl, n-propyl, and isopropyl alcohol. Up to as much as about 10 percent of water, brines, or alkylene glycols may be present in most instances without accelerating the setting rate of the polymer to the extent that premature gelation occurs.

The mineral material in a fine state of division may be an hydraulic cement of the nature of portland, aluminous or high sulfoaluminate cement; it may be volcanic ash or fly ash (such cement commonly being called pozzolan cement). Barium sulfate (barytes), silica, pulverized coal, hard resins, nut flour, fine sand, and $CaCO_3$, may also be used.

An inert particulate or pulverulent material may be present as extender or filler in either liquid. Plaster of Paris (largely calcium sulphate hydrate) may be used either with the mineral material or with the polymer or in both up to a total of about 10 percent by weight of the final mixture. The presence of a limited amount of $CaSO_4$ enhances the strength of the final gelled product. A small percent, e.g., up to 6 percent by weight of the final mixture, of clay, may be used.

The concentrations of the ingredients in either of the two liquids is not highly critical. It is, of course, necessary that either the polymer slurry or the cementious slurry be readily pumpable and yet not contain such large quantities of the carrier liquid, i.e., polyglycol or hydrocarbon liquid in one instance or water in the other, as to make a slurry that is so diluted that gelation is undesirably slow or the resulting product objectionably weak. Unnecessarily large amounts of carrier fluid may also cause the respective fluids to be so low in viscosity as to resist satisfactory emplacement as desired.

The concentration of the polymer in the inert liquid carrier, e.g., a polyglycol such as diethylene glycol or a hydrocarbon such as kerosene and the finely subdivided or pulverulent mineral materials, e.g., Litepoz (a composition largely consisting of fly ash) and water, may vary rather widely. The following percentages by weight of the final mixture of all ingredients are recommended:

| Ingredient | Percent by weight of final mixture | |
|---|---|---|
| | Operable range | Preferred range |
| Pulverulent mineral | 20-60 | 40-50 |
| Water | 22-44 | 25-30 |
| Polymer | 1-15 | 5-10 |
| Inert liquid carrier for the polymer | 12-25 | 10-20 |

Various mixtures of the different components are quite acceptable, e.g., (1) mixtures of various minerals including silica flour, sulfates such as barytes or plaster of Paris, portland cement, fly ash; (2) mixtures of various polymers including acrylamides copolymerized with vinylpyrrolidine, vinylmorpholinone, maleic anhydride, or polymerized styrenesulfonate, vinyltoluenesulfonate and polymerized sodium salts thereof; (3) brines may be used in place of water or in admixture therewith; and (4) mixtures of substantially miscible polymer-carrying liquids, e.g., diethylene glycol, triethylene glycol, dipropylene glycol, triethylene glycol, and glycerol or toluene, benzene, kerosene, diesel oil, oil crude oil.

Reference to the annexed drawing makes more clear the practice of the invention wherein two separate conduits are lowered into the wellbore, terminating at the opening or break in the formation where lost circulation is occurring. It is to be understood that the conduits may be of different design including concentric tubes and the level of termination of the lower open ends of the tubes may vary somewhat from that which corresponds exactly with the opening to be plugged. In severe cases it may be advisable to employ one or more packers to segregate the level at which the opening to be plugged exists.

The invention may be practiced by employing but one conduit or one stream wherein the fluid, inert to and containing the polymer, and the aqueous fluid containing the hydraulic cement or fly ash are injected in succession, the fluid being separated, while being injected to the point of need by wiper plugs (preferably with a spacer liquid between the plug) which are dispaced at the point of need and permit intermingling of the fluid at the point of need.

In the drawing, each of FIGURES 1, 2 and 3 depicts a wellbore 2, at the drilling stage, penetrating a geologic formation. Each shows a surface casing 4 cemented into place by cement 6. In each figure there is also shown a break or opening 8 in the wellbore wall near the bottom of the hole out through which drilling fluid has been escaping to the extent that drilling has been halted, the bit pulled from the hole, and treatment commenced to correct the lost fluid, according to the method of the invention performed.

FIGURE 1 shows the practice of the invention wherein two fluids $a$ and $b$ are injected, maintained out of contact with each other during injection by means of wiper plug 10 and optionally the fluids (after displacement of the plug and being forced into intimate admixture 11 in the vicinity of the opening or break) being retained near or in the opening by packer 12.

FIGURE 2 shows an embodiment of the invention wherein the two fluids, $a$ and $b$, are injected via separate streams down pipes 14 and 16 and are intermixed below the outlets of the pipes.

FIGURE 3 shows another embodiment of the invention wherein the fluids $a$ and $b$ are injected in separate streams, one down pipe 18 and the other down annulus 20 between said pipe and the borehole wall, the streams becoming intermixed below the outlet of the pipe.

The following examples are illustrative of the broad practice of the invention. However, the materials for use in the invention need not be the specific ones employed in the examples, but may be any of those which fulfill the requirements of the generic concept.

EXAMPLE 1

Fifteen parts by weight of the particulate polyacrylamide having an average molecular weight of between 500,000 and 1,500,000 were admixed with about 25 parts by weight of diethylene glycol in a suitable container. A second composition was prepared by admixing 100 parts by weight of diethylene glycol in a suitable container. A a second suitable container. Each container was provided with a pressurizing means or pump and a pipe leading therefrom to a locus where a void exists and at which it was desired that the two-fluid compositions be brought together to provide a solid plug against fluid flow. Pressure was applied to each of the containers and the contents thereof forced from the container, in proportions of the two slurries by weight of about 2.5 of the glycol polymer to 1 of the aqueous cement. Each fluid was forced through the pipe leading therefrom and out the end thereof where the fluids were intermixed. Within about one to two minutes following such intermixture of the two compositions, the resulting mixture set to a firm solid of adequate strength to withstand the passage of fluid therethrough.

EXAMPLE 2

Five parts by weight of particulated polyacrylamide containing up to 60% of the carboxamide groups hydrolyzed to carboxyl groups and 10 parts by weight of plaster of Paris were admixed with about 20 parts of kerosene in a suitable container. One hundred parts of Litepoz, a trade-marked brand of fly ash cement, were admixed with about 50 parts of water in a second container. The two resulting mixtures were then intermixed to provide a material which rapidly set to a firm water-tight composition suitable for closing off openings and filling voids, including the type of breaks and channels leading from a wellbore and which often result in lost circulation.

EXAMPLE 3

For convenience, the following materials, in the amounts suggested, may be premixed for subsequent use in oil, gas, brine, or water drilling operations: (a) 6.65 pounds of cement or Litepoz are admixed with 0.4 gallon of water in one container, (b) 0.333 pound of polyacrylamide, and 0.666 pound of plaster of Paris are admixed with 0.15 to 0.25 gallon of kerosene in a separate container. Any number of gallons of the two components to make the gelable composite mixture may easily be made from the above recipe for one gallon.

The following procedure is one suggested mode for treating a wellbore having a troublesome opening therein, for the purpose of inhibiting lost circulation, according to the invention:

(1) Stop drilling and pull the bit from the hole.

(2) Inject the composition, identified as composition (a), above in an amount calculated as necessary to provide sufficient final volume of gelable composition to plug off the troublesome opening.

(3) Run a spacer or wiper plug down the hole behind composition (a).

(4) Inject composition identified as composition (b) above.

(5) Increase the injection pressure sufficiently to force both compositions (a) and (b) into the troublesome opening in the borehole wall where they intermix.

(6) Await gelation of the thus emplaced mixture, usually requiring only a few minutes or at most 0.5 to 1.0 hour.

(7) Circulate drilling mud to insure a good seal, and resume drilling.

EXAMPLE 4

To inhibit lost circulation from a wellbore being drilled in a geologic formation, a further example of the invention is as follows:

Adequate mixing pressurized, stationary or portable, tanks are filled to the extent necessary with the desired amount of each of the two components required by the invention, viz., a liquid inert to and containing a polymer dispersed therein in one tank and a mineral material dispersed in water in the other tank. Each component is pumped down the wellbore through independent or separated streams to the location where the break in the wellbore exists and through which drilling fluid is being lost. The components, thereby brought together into intimate contact, set to a firm resilient plugging material. Thereafter, any injected composition which may have set in the wellbore is drilled out and drilling resumed, employing drilling fluid in the conventional manner but thereafter not accompanied by the objectionable loss thereof into the void in the formation which was in communication with the wellbore.

The mixture prepared according to the invention was shown to be fully satisfactory as a plugging composition by the following procedure.

The apparatus for use in ASTM Standards, part 7 (1958), pp. 124–133, was assembled. The gelable composition of the invention to be tested was placed in the cup and the depth of penetration of the cone into the composition in millimeters at time intervals, measured in minutes, was determined. The less the number of millimeters of penetration, the firmer and more resistant to the passage of fluids was the gelled composition. A penetration of 25 millimeters or less is satisfactory as a plugging agent to inhibit lost circulation from boreholes.

Any of the compositions of the invention prepared and tested showed a penetration of 11 or less after 10 minutes.

Having described our invention, what we claim and desire to protect by Letters Patent is:

1. The method of plugging an opening formed by confining solid faces, edges, or sides which comprises (1) emplacing two fluid components (a) and (b) which are maintained out of contact with each other until they have been brought together and intermixed at said opening and which when so intermixed form a gelable intermixture that forms a substantially fluid-tight solid plug in said opening, component (a) comprising a particulate polymeric material suspended in a fluid carrier substantially inert to the gelation properties of said polymer and component (b) comprising a particulated hydraulic material in an aqueous fluid; and (2) bringing components (a) and (b) together into intimate admixture at said opening to effectuate a gelable composition which rapidly becomes a solid plugging material against the passage of fluids therethrough.

2. The method according to claim 1 wherein said polymeric material employed is a polymer made by polymerizing a monomeric mixture comprising at least about 50% by weight of acrylamide and the remaining monomers in said mixture consist essentially of ethylenically unsaturated monomers copolymerizable with acrylamide.

3. The method according to claim 2 wherein said polymer has an average molecular weight of between about 500,000 and 5,000,000 and is selected from (1) polyacrylamide and hydrolyzed polyacrylamide, (2) polyacrylic acid, (3) acrylamide crosslinked with between about 500 and 5,000 parts per million of a cross-linking agent selected from the class consisting of methylenebisacrylamide, divinyl benzene, and azobisisobutyronitrile, (4) copolymers of acrylamide and a monomer selected from the class consisting of vinyl morpholinone, vinyl pyrrolidone, maleic anhydride, and vinyloxazolidinone, (5) polyvinyl toluene sulfonate, (6) polystyrene sulfonate, and (7) water-soluble salts of said polymer.

4. The method according to claim 1 wherein said liquid substantially inert to said polymer is selected from the class consisting of polyglycols, glycerol, liquid hydrocarbons, monoaliphatic alcohols of greater than 3 carbon atoms.

5. The method according to claim 1 wherein said hydraulic material is selected from portland cement, aluminous cement, high sulfoaluminate cement, fly ash, pulverulent natural rock, silica flour, sand of less than about 100 mesh, barium sulfate, and calcium carbonate.

References Cited

UNITED STATES PATENTS

| | | | |
|---|---|---|---|
| 2,236,987 | 4/1941 | Bechtold | 166—31 |
| 2,612,954 | 10/1952 | Hamilton | 166—28 |
| 2,761,511 | 9/1956 | Billue | 106—90 X |
| 3,021,291 | 2/1962 | Thiessen | 106—90 X |
| 3,058,520 | 10/1962 | Woodard | 166—31 |
| 3,197,428 | 7/1965 | Siegele | 166—33 X |
| 3,306,870 | 2/1967 | Eilers | 166—33 X |
| 3,342,263 | 9/1967 | Fischer | 166—33 |

NILE C. BYERS, JR., *Primary Examiner.*

U.S. Cl. X.R.

175—72

UNITED STATES PATENT OFFICE
CERTIFICATE OF CORRECTION

Patent No. 3,448,800          Dated June 10, 1969

Inventor(s) Patrick N. Parker and Winton W. Wahl

It is certified that error appears in the above-identified patent and that said Letters Patent are hereby corrected as shown below:

Column 4, line 22, cancel beginning with "diethylene glycol in a suitable container. A"; after "of" insert -- fly ash with 50 parts by weight of water in --.

SIGNED AND SEALED

NOV 18 1969

(SEAL)
Attest:

Edward M. Fletcher, Jr.
Attesting Officer

WILLIAM E. SCHUYLER, JR.
Commissioner of Patents